Dec. 12, 1967     Z. NERI     3,358,191
FAST CIRCUIT BREAKER TRIPPING MECHANISM HAVING A TRIPPING COIL
ENERGIZED BY THE CONTROL ELEMENT CURRENT AND THE ANODE-CATHODE
CURRENT OF A CONTROLLED RECTIFIER
Filed May 18, 1965
5 Sheets-Sheet 1
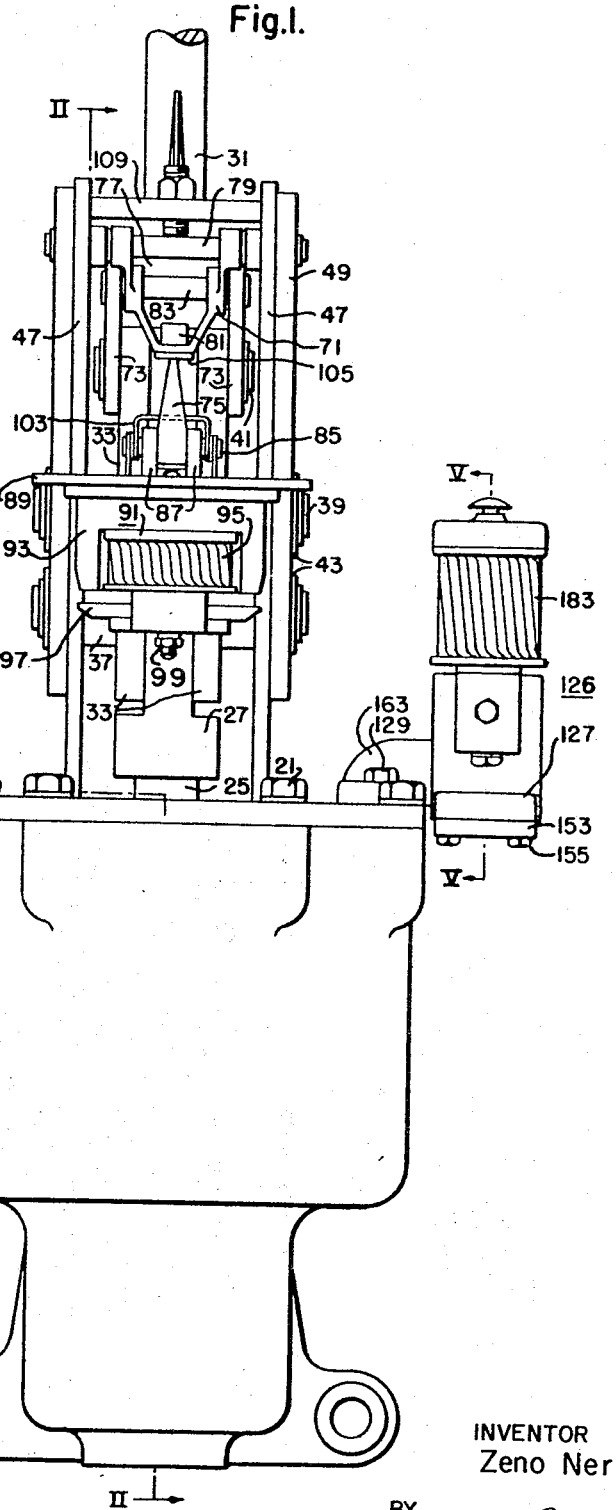
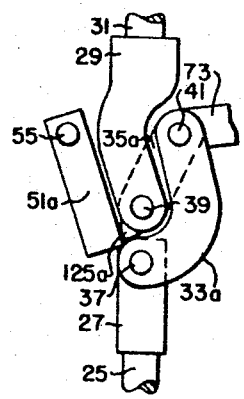
WITNESSES:
Bernard R. Giaquez
James F. Young
INVENTOR
Zeno Neri
BY
Willard R. Crout
ATTORNEY Dec. 12, 1967     Z. NERI     3,358,191
FAST CIRCUIT BREAKER TRIPPING MECHANISM HAVING A TRIPPING COIL
ENERGIZED BY THE CONTROL ELEMENT CURRENT AND THE ANODE-CATHODE
CURRENT OF A CONTROLLED RECTIFIER
Filed May 18, 1965     5 Sheets-Sheet 5
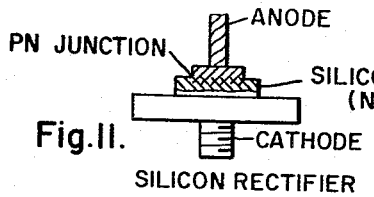
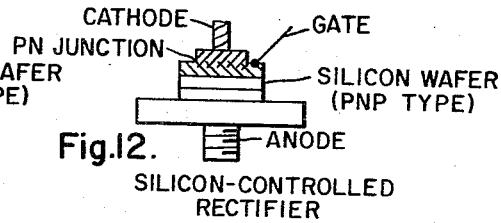
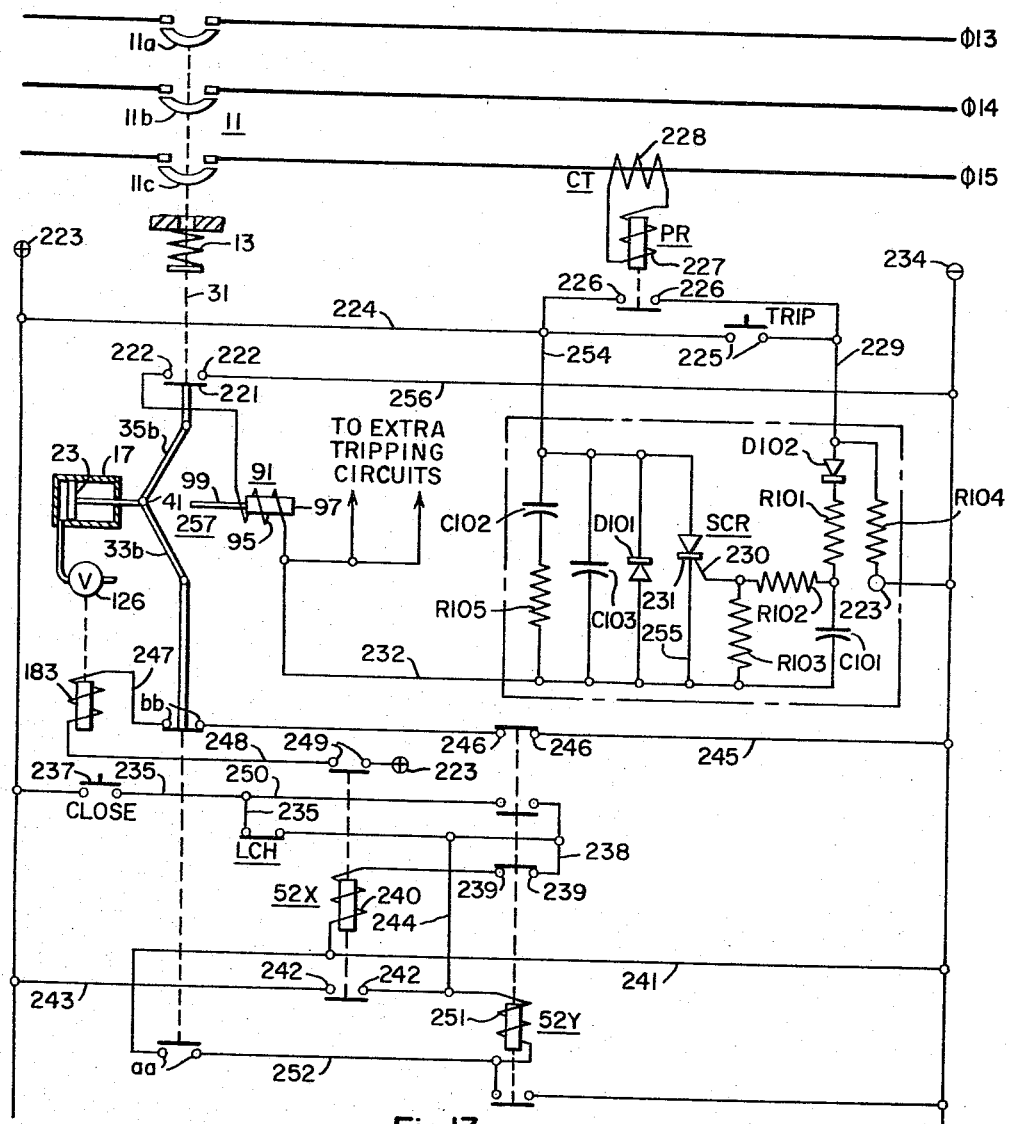
Fig.13.

United States Patent Office 3,358,191
Patented Dec. 12, 1967

3,358,191
FAST CIRCUIT BREAKER TRIPPING MECHANISM HAVING A TRIPPING COIL ENERGIZED BY THE CONTROL ELEMENT CURRENT AND THE ANODE-CATHODE CURRENT OF A CONTROLLED RECTIFIER
Zeno Neri, Wilkins Township, Pittsburgh, Pa., assignor to Westinghouse Electric Corporation, Pittsburgh, Pa., a corporation of Pennsylvania
Filed May 18, 1965, Ser. No. 463,437
6 Claims. (Cl. 317—33)

This is a continuation-inpart of application Ser. No. 181,864 filed Mar. 23, 1962.

This invention relates to circuit-breaker tripping mechanisms in general and, more particularly, to an improved and highly-efficient circuit-breaker tripping mechanism utilizing a solid-state controlled rectifier for highly-efficient operation.

Under normal operating conditions, the current required to trip a breaker flows through the contacts of the protective relay which initiates the breaker tripping operation. When the three poles of a three-phase breaker are equipped with individual mechanisms, thus requiring individual tripping devices, or when several breakers are tripped in parallel, the total tripping current is often too high to be carried by the contacts of the protective relay. Under these conditions, a heavy-duty load relay is interposed between the protective relay and the tripping device. The protective relay then carries only the current required to energize the heavy-duty load relay, whose contacts, in turn, carry the tripping current. Unfortunately, such a scheme interposes an appreciable time delay (more than ½ cycle on a 60-cycle basis) from the time the protective relay closes its contacts to the time that voltage is applied to the tripping device. Such a time delay can often not be tolerated.

It is a general object of the present invention to provide an improved tripping circuit, in which a solid-state controlled rectifier, such as a silicon-controlled rectifier, can be used as the interposing relay, thus reducing the time delay to an insignificant value (in the order of a few microseconds), and at the same time reducing the current flow through the contacts of the protective relay to a very small value.

A more specific object of the present invention is the provision of a silicon-controlled rectifier in the tripping circuit for a circuit-interrupting mechanism in which the electromagnetically-released latching means for the breaker are energized as a result of the conducting state of the silicon-controlled rectifier, the latter blocking in the forward direction until a small signal is applied to the gate lead thereof.

Still a further object of the present invention is the provision of an improved tripping circuit utilizing a solid state controlled rectifier which may readily be adapted for various circuit-breaker operating mechanisms.

A further object of the present invention is the provision of an improved high-speed tripping circuit, responsive to the current condition in one of a plurality of control lines, and operating to immediately actuate the tripping mechanisms for a plurality of conjointly-controlled circuit breakers.

Still a further object of the present invention is the provision of an improved tripping circuit for a three-phase transmission line involving a separate circuit-breaker for each phase conductor, in which the tripping circuit utilizes a solid-state controlled rectifier, say one of the silicon-controlled rectifier type, whereby the occurrence of an abnormal condition in one of the lines is effective to supply a signal to the gate lead of the silicon-controlled rectifier, and thereby render the same conductive in the forward direction to simultaneously bring about the tripping of the several circuit-breaker operating mechanisms.

Further objects and advantages will readily become apparent upon reading the following specification, taken in conjunction with the drawings, in which:

FIGURE 1 is a side elevational view of a circuit-breaker operating mechanism embodying the principles of the present invention;

FIG. 6 is a fragmentary view showing a modification the trip-free mechanism;

FIG. 11 illustrates somewhat diagrammatically the internal construction of an ordinary silicon rectifier;

FIG. 12 illustrates in similar manner the internal construction of a silicon-controlled rectifier; and, FIG. 13 illustrates diagrammatically the improved tripping circuit of the invention as applied to a circuit-breaker operating mechanism very similar to the one set forth in FIGS. 1–6 of the drawings.

Figure 2:
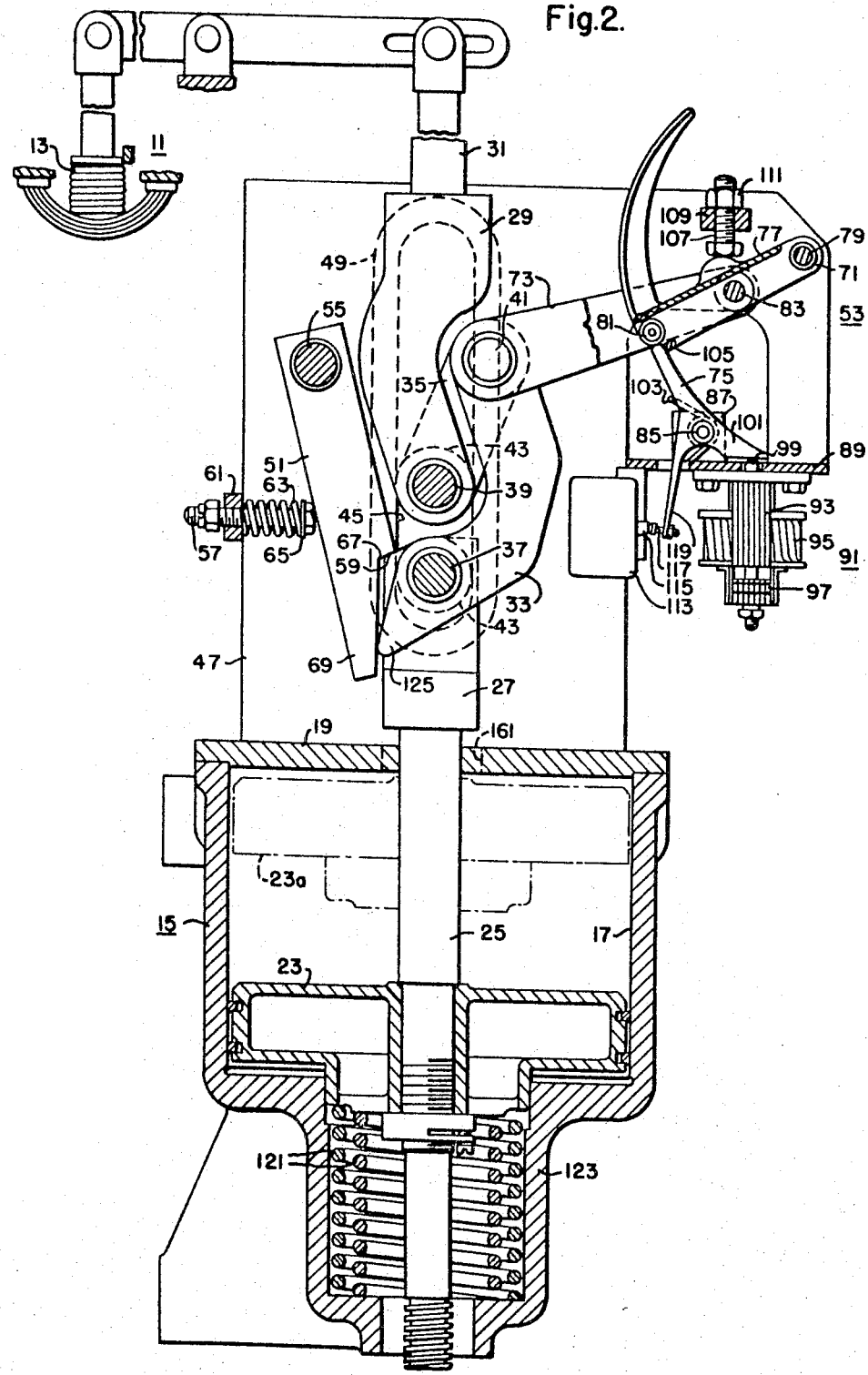
FIG. 2 is a vertical sectional view taken substantially on line II—II of FIG. 1, looking in the direction indicated by the arrows.

Referring to FIG. 2 of the drawings, the circuit breaker 11 which is illustrated diagrammatically, may be of any conventional construction either oil-breaker, air-break or gas-blast type and is adapted to be operated to the open position by means of an accelerating spring 13. The circuit breaker is adapted to be operated to the closed position by means of an operating mechanism which in the embodiment shown is of the compressed fluid type. The operating mechanism includes a main casting 15 (FIGS. 1 and 2) formed to provide an operating cylinder 17 closed at its upper end by a plate 19 secured to the casting 15 by means of bolts 21 (FIG. 1). Mounted in the operating cylinder 17 (FIG. 2) is an operating piston 23 having secured thereto a piston rod 25 which is slidable through an air-tight opening in the plate 19. Rigidly secured to the upper end of the piston rod 25 is a coupling 27 which is releasably connected to a coupling 29 rigidly secured to a breaker operating rod 31 by means of an inverted or overlapping toggle comprising toggle links 33 and 35. The breaker operating rod 31 is operatively connected to the circuit breaker 11 by means of a suitable linkage.

The toggle link 33 comprises a pair of spaced parallel links pivotally connected by means of a pivot pin 37 to the coupling 27. The toggle link 35 comprises a single link disposed between the links 33 and is pivotally connected by means of a pivot pin 39 to the coupling 29. The toggle links 33 and 35 are pivotally connected together by means of a knee pivot pin 41.

In order to provide for straight-line movement of the piston rod 25 and the breaker operating rod 31, and to assist the trip-free toggle 33–35 in maintaining the breaker closed, each of the pivot pins 37 and 39 are provided with rollers 43, there being a roller 43 mounted on each end of each of the pivot pins 37 and 39. These rollers cooperate with corresponding vertical slots 45 formed in a pair of spaced frame members 47 rigidly mounted on the plate 19 and extending upwardly therefrom in spaced parallel relation. In order to provide suitable bearing surfaces for the rollers 43, plates 49 provided with slots coinciding with the slots 45 are secured to the outside of each of the frame members 47 in any suitable manner, preferably by welding.

The circuit breaker is held in the closed position by means of a main latch 51 and a light load latch mechanism indicated generally at 53. The main latch 51 is pivotally mounted on a pin 55 supported in the frame members 47 and is biased by means of a spring pressed plunger 57 into latching engagement with a latching surface 59 on the coupling 27. The plunger 57 is slidably mounted in an opening in a cross bar 61 rigidly supported between the frames 47 and is biased by means of a compression spring 63 compressed between the cross bar 61 and a washer 65 on the plunger. The main latch 51 is provided with a latching surface 67 for cooperating with the latching surface 59 on the coupling 27 and also has a downwardly extending projection 69 the purpose of which will be described later.

The light-load latching mechanism 53 includes an underset tripping toggle comprising toggle links 71 and 73 and a trigger latch 75 cooperating to releasably maintain the tripping toggle in its underset position. The toggle links are rigidly joined by a cross member 77 and are pivotally mounted on a fixed pivot pin 79 supported by the frame members 47. At their free ends the toggle links 71 carry between them a latch roller 81 with which the trigger latch 75 cooperates to maintain the tripping toggle 71–73 in its underset position. The toggle link 73 comprises a pair of spaced parallel links disposed one on each side of the link 71 and pivoted on the knee pivot pin 41 of the trip free toggle 33–35 outside of the toggle links 33. The toggle links 73 are pivotally connected to the toggle link 71 by means of a knee pivot pin 83.

The trigger latch 75 is pivotally mounted on a pivot pin 85 supported in a pair of spaced brackets 87 (only one being shown) which in turn are rigidly secured to a cross plate 89 mounted on the frame members 47. Also mounted on the under side of the cross plate 89 is a tripping electromagnet 91 comprising a fixed magnet yoke 93, an energizing winding 95 and a movable armature 97. A trip rod 99 is secured to the armature 97 and extends upwardly through an opening in the magnet and through an opening in the plate 89, the upper end of the rod 99 disposed beneath a projection 101 of the trigger latch 75.

A spring 103 biases the latch 75 to latching position which is determined by a cross bar 105 between the side members of the toggle link 71 adjacent the latch roller. The underset position of the tripping toggles 71–73 is adjustably determined by means of an adjustable stop screw 107 threadedly engaging a cross bar 109 rigidly supported between the frames 47 and locked in adjusted position by a lock nut 111.

A latch checking switch 113 is provided for checking the position of trigger latch 75. The switch 113 is mounted on one of the frames 47 and the contacts (not shown) are controlled by a plunger 115 which is engaged by an adjustable stud 117 mounted in an arm 119 integral with the latch 75 when the latch is in latching position.

Assuming the breaker to be in the closed position it is tripped open in the following manner:

Referring to FIG. 2 of the drawings, in the closed position of the breaker the main latch 51 holds the piston 23 in the closed position in which it is shown against the force of nested compression springs 121 compressed between the bottom of the piston 25 and the bottom of a downwardly extending cylindrical portion 123 of the main casting 15. The accelerating spring 13 applies an upward force on the breaker operating rod. Since the pivot pins 37 and 39 are constrained by the slots 45 to move in a straight line, a small component of this force is applied through the line 35 to the tripping toggle 71–73. Due to the tripping toggle being only slightly underset a very small component of the force of the accelerating spring is applied through the tripping toggle 71–75 and the latch roller 81 to the light-load latch 75. When the tripping electromagnet 91 is energized from a suitable source the armature 97 moves the trip rod 99 upward to engage and actuate the trigger latch 75 in unlatching direction to release the underset tripping toggle 71–73. The force of the accelerating spring 13 applied to the tripping toggle immediately causes this toggle to collapse to the position shown in FIG. 3. As soon as the tripping toggle 71–73 starts to collapse the breaker operating rod 31 starts to move upwardly to open the breaker. The upward movement of the breaker operating rod 31 and the collapse of the tripping toggle 71–73 causes clockwise rotation of the trip-free toggle link 33. When the breaker rod 31 has traveled upwardly a very short distance, approximately one-half inch, a tail 125 on the toggle link 33 below the pivot pin 37 engages the projection 69 on the main latch 51 and cams the main latch 51 to unlatching position and releases the piston rod 25, whereupon the powerful springs 121 thrust the piston 23 and the piston rod 25 upwardly at a speed greater than the opening speed of the breaker operating rod 31. Since the pivot pins 37 and 39 are constrained by the slot 45 to travel in a straight line and the speed of upward movement of the pin 37 is greater than the speed of the pin 39, the toggle link 33 will cause the link 35 to rotate counterclockwise about the pivot 39 toward the normal inverted position of the toggle 33–35. This action through the pin 41 and link 73 rotates the link 71 clockwise about its pivot 79 far enough to permit reengagement of the trigger latch 75 under the latch roller 81. This effectively recouples the piston rod 25 to the breaker operating rod 31 and the parts thereafter travel in unison to the full open position of the breaker moving the piston 23 to the top of the cylinder 17.

Recoupling of the piston rod 25 to the breaker operating rod 31 may be effected earlier in the opening operating by using the modification illustrated in FIG. 6 of the drawings. In this modification the piston rod 25 is connected to the breaker operating rod 31 by means of an inverted toggle comprising toggle links 33a and 35a respectively pivoted on the pivot pins 37 and 39. The toggle links 33a and 35a are pivotally connected together and to the tripping toggle 71–73 by the knee pin 41. The tail 125 is omitted from the toggle link 33a, and the toggle link 35a is provided with a tail 125a. Also, the projection 69 is omitted from the latch 51a.

Figure 3:
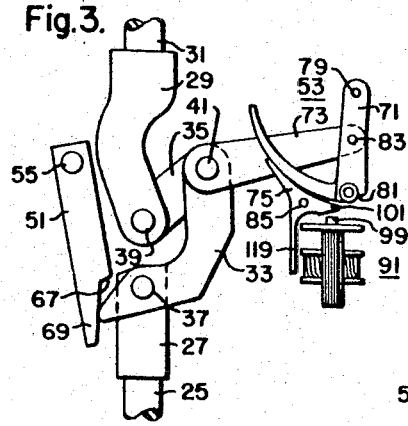
FIG. 3 is a fragmentary elevational view of the latching mechanism and the trip-free mechanism with the parts in the tripped position, but before the breaker has moved to the fully-open position.
Figure 4:
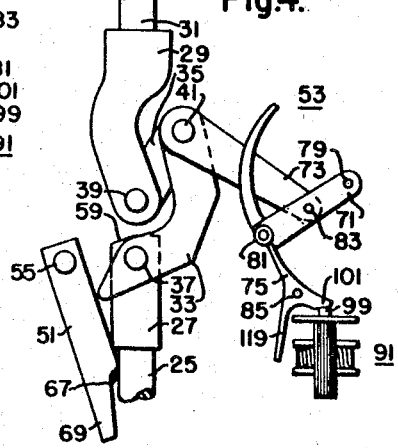
FIG. 4 is a view similar to FIG. 3 but showing the parts in their reconnected and relatched positions.

The operation of the trip-free toggle shown in FIG. 6 is the same as that shown in FIGS. 2, 3 and 4 with the exception that the main holding latch 51a is actuated to unlatching position by the toggle link 35a instead of the lower toggle link 33a. The speed of angular movement of the toggle link 35a about its pivot 39 is approximately twice that of the toggle link 33a about its pivot 37. Also, the tail 125a actuates the latch 51a with a much smaller lever arm than the tail 125 (FIG. 1). The combination of these features effects unlatching of the piston rod after a movement of only approximately 5/32 of an inch travel of the breaker rod in opening direction following a tripping operation. This results in quicker recoupling of the piston rod to the breaker rod.

The circuit breaker is closed by admitting compressed gas to the operating cylinder above the piston 23. The trip-free toggle 33–35 and the latch mechanism is shown in FIG. 4 in the fully open position of the breaker. When compressed gas is admitted to the cylinder 17 the piston 23 and the piston rod 25 are forced downwardly drawing the link 33 therewith. Since the toggle link 71 of the tripping toggle is now latched in the position shown in FIG. 4, the link 73 pivots about its pivot pin 83, which acts as a fixed pivot, thereby holding the toggle 33–35 in thrust transmitting position during the closing operation. The closing force applied to the link 33 is, therefore, transmitted through the link 35 to move the breaker operating rod downwardly and close the breaker.

Figure 5:
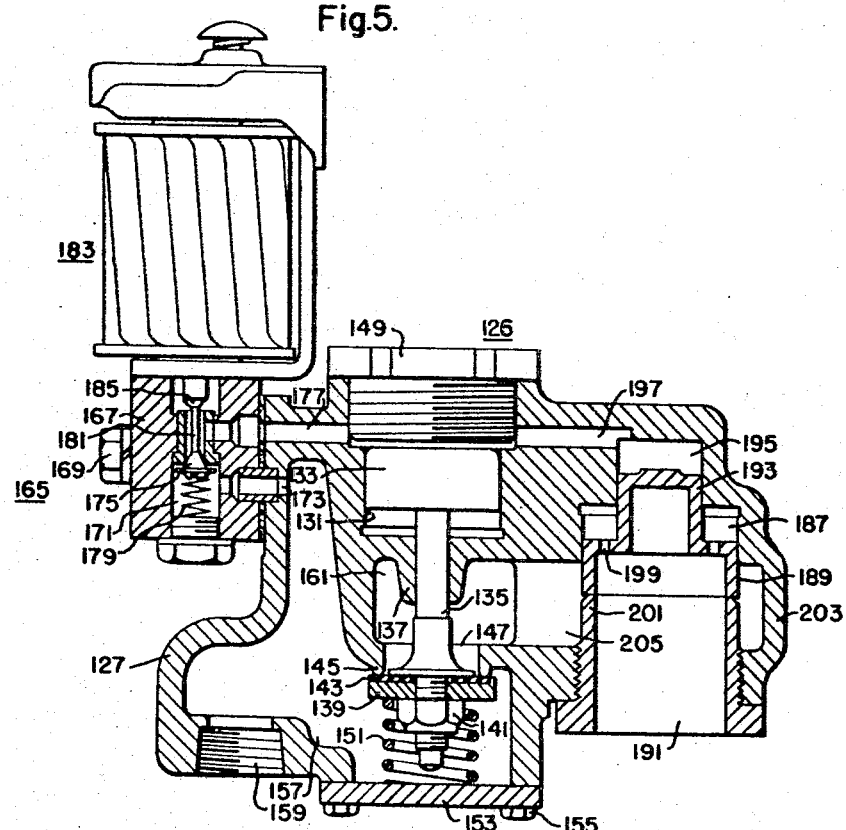
FIG. 5 is an enlarged sectional view, taken on line V—V of FIG. 1, showing the valve mechanism for controlling the admission of compressed fluid to the operating motor.

Compressed gas is admitted to the cylinder 17 to close the circuit breaker by means of an inlet valve device indicated generally at 126 (FIGS. 1 and 5). The inlet valve device comprises a main housing 127 secured to the top of the plate 19, which closes the upper end of the operating cylinder 17, by means of bolts 129 (only one being shown). The housing 127 has a cylinder 131 formed therein in which is disposed a valve-operating piston 133. Rigidly secured to the piston 133 is a valve rod 135 extending downwardly through a guide bearing 137, and a valve member 139 is secured to the lower end of the valve rod 135 by means of a nut 141. The valve member 139 is provided with a valve facing 143 composed of a tough, resilient material and is normally seated against an annular valve seat 145 formed in the housing 127 around a large inlet passage 147. The cylinder 131 is closed at its upper end by means of a closure member 149 threadedly engaging an enlarged opening in the housing 127.

The valve 139 and the piston 133 are biased to the closed position by means of a spring 151 compressed between the valve member 139 and a closure plate 153 suitably secured to the bottom of the housing 127 by means of bolts 155. A high-pressure chamber 157 in the housing 127 below the valve 139 is supplied with fluid under pressure from a suitable source by means of a passage 159. An inlet port 161 (FIG. 5) above the valve 139 communicates with the operating cylinder 17 (FIG. 2) by means of a passage formed by a portion 163 (FIG. 1) of the housing 127.

The inlet valve 139 is operated to the open position by admitting fluid under pressure from the high-pressure chamber 157 to the cylinder 131 above the valve-operating piston 133. This is accomplished by means of an electromagnetically operated pilot valve device indicated generally at 165 (FIG. 5). The pilot valve device comprises a housing 167 secured to the housing 127 of the inlet valve device by means of bolts 169 (only one being shown). The housing 167 is provided with a chamber 171 communicating by means of a passage 173 with the high-pressure chamber 157. A valve 175 normally closes off the chamber 171 from a passage 177 communicating with the cylinder 131 above the piston 133. The valve 175 is biased to closed position by means of a spring 179 and is secured on a rod 181 which, in turn, is attached to the armature (not shown) of an electromagnet 183. Also mounted on the rod 181 is an exhaust valve 185 normally opening the passage 177 to atmosphere and which closes this passage upon opening of the valve 175 to admit compressed fluid to operate the piston 133.

Formed in the housing 127 is a cylinder 187 in which is disposed a cup-shaped exhaust valve 189 for controlling a large exhaust port 191. The valve 189 has a reduced portion 193 disposed in a cylinder 195 which is communicated by means of a passage 197 with the cylinder 131 and the passage 177. The cylinder 187 above the valve 189 is normally at atmospheric pressure by virtue of one or more openings 199 therein.

The exhaust valve 189 is normally biased by means of gravity or suitable spring means (not shown) to the closed position where it is seated on a beveled annular valve seat 201 which is screwed into the housing 127. A chamber 203 surrounding the valve seat 201 and the lower portion of the valve 189 is communicated with the inlet 161 by means of a large passage 205.

When the electromagnet 183 is energized the rod 181 is moved downwardly closing the exhaust valve 185 and opening the valve 175 thus admitting fluid under pressure from the high-pressure chamber 157 through the passages 173 and 177 to the cylinder 131 above the piston 133. This forces the piston 133 down moving the valve member 139 to open position to admit compressed fluid through the passage 147 and the inlet port 161 to the operating cylinder 17 to close the breaker in the previously described manner.

At the same time compressed fluid is admitted to the cylinder 131 to effect opening of the inlet valve 139, compressed fluid is also admitted through the passage 197 to the cylinder 195 above the portion 193 of the exhaust valve 189 to maintain the exhaust valve closed during the circuit breaker closing operation.

When the electromagnet 183 is deenergized near the end of a closing operation, the valve 175 closes and the valve 185 opens to vent the high-pressure fluid from the cylinder 131 to permit the spring 151 to close the inlet valve 139. At the same time, the high-pressure fluid is vented from the cylinder 195 through the passages 197 and 177 whereupon the closing charge of high-pressure fluid in the operating cylinder 17 and in the chamber 203 blasts the exhaust valve 189 to open position to vent the compressed fluid from the operating cylinder 17. As soon as the closing charge of compressed fluid is exhausted from the operating cylinder, the exhaust valve is restored by the force of gravity or other biasing means (not shown) to its closed position.

When the breaker arrives at the fully closed position the spring 63 (FIG. 2) moves the latch 51 into engagement with the coupling to hold the mechanism and the breaker in the closed position.

If there is no fault condition such as an overload or short circuit in the main circuit at the time the contacts are closed, the circuit breaker will be latched closed as just described. However, if there is a fault condition on the main circuit at the time the circuit breaker completes the main circuit the trip device 91 will be immediately energized and effect release of the latching mechanism 53 to trip the breaker free of the operating piston 23.

If the control circuit is set for instantaneous automatic reclosing, the electromagnet 183 of the inlet valve device will be energized by means of the latch checking switch 113 the instant the trigger latch 75 (FIG. 2) reaches latched position. This occurs at approximately the time in the opening stroke when the breaker contacts have separated far enough to extinguish the arc. As set forth previously, relatching of the trigger latch 75 effectively recouples the piston rod 25 to the breaker operating rod. Energization of the electromagnet 183 effects opening of the main inlet valve 139 and admits compressed gas to the cylinder 17 to effect closing of the breaker.

Figure 7:
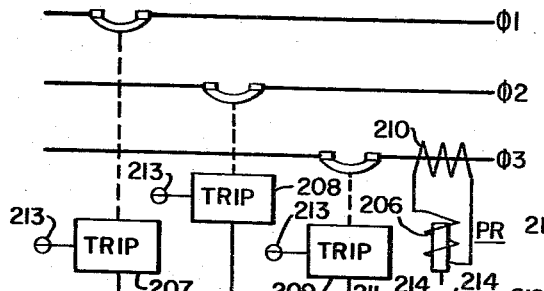
FIG. 7 illustrates a three-phase line having separate tripping mechanisms associated with each phase conductor, and utilizing a single protective relay for the energization thereof.

FIG. 7 of the drawings illustrates the controlling of a three-phase circuit $\phi 1$, $\phi 2$, $\phi 3$, each phase conductor being controlled by a separate tripping mechanism 207, 208 and 209. The tripping mechanisms are illustrated as being energized by a protective relay PR, the coil 206 of which is energized from the secondary winding 210 of a current transformer CT. The current transformer CT is, of course, responsive to the current passing through the phase conductor $\phi 3$. It will be apparent that upon a suitable value of overload current passing through the phase conductor $\phi 3$, the protective relay PR will be picked up and will energize a circuit 211 from a plus terminal 212 to the several tripping mechanisms, in parallel, to the other negative terminals 213. It will be obvious that the entire current for the tripping mechanisms of the three breakers must necessarily pass through the contacts 214 of the protective relay PR. For many applications, this is an intolerable situation because of the excessive current flow.

Figure 9:
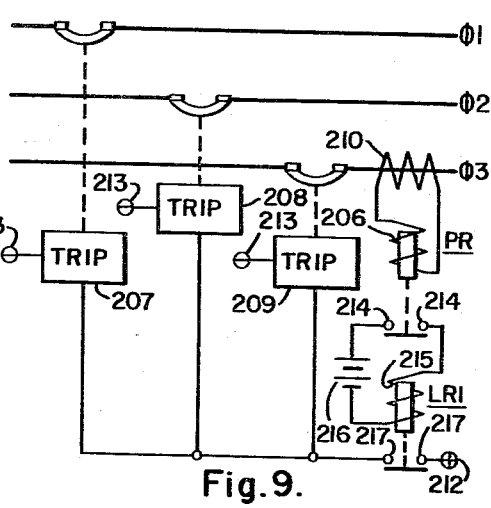
FIG. 9 illustrates the interposition of a heavy-duty load relay between the protective relay and the tripping mechanisms of the tripping circuit of FIG. 7.

With reference to FIG. 9, it will be noted that there is interposed between the protective relay PR and the tripping mechanisms 207–209 a heavy-duty load relay LR1, the coil 215 of which is picked up by the contacts 214 of the protective relay PR, the circuit also including a source of direct current, such as the battery 216. The heavy-load contacts 217 of the load relay LR1 perform the same function as the contacts 214 of the protective relay PR in the tripping circuit illustrated in FIG. 7. It will, however, be noted that the interposition of an additional load relay requires an appreciable time delay, say of the order of ½ cycle on a 60-cycle basis. This is undesirable for many applications.

Figure 8:
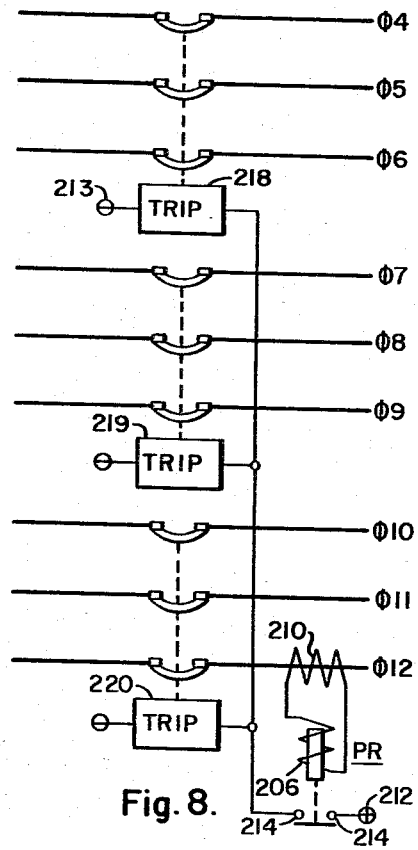
FIG. 8 is a diagrammatic view of a plurality of three-phase lines with a plurality of three-phase tripping mechanisms illustrating the energization thereof by a single protective relay.
Figure 10:
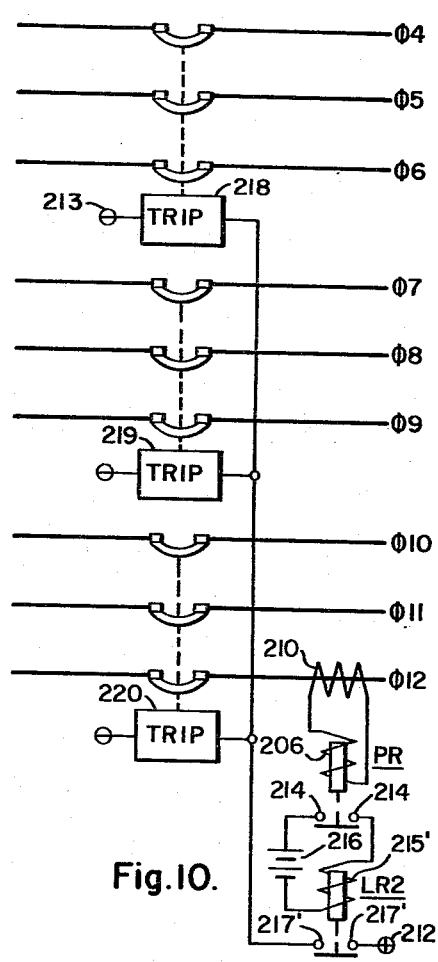
FIG. 10 illustrates diagrammatically a like condition of interposing a heavy-duty load relay between the protective relay and the tripping mechanisms for the three three-phase circuit interrupters.

Reference is directed to FIG. 8 of the drawings in which there is illustrated a plurality of three-phase transmission lines, each transmission line being protected by a separate three-phase breaker 218, 219, 220. Again a protective relay PR is responsive to the current passing through the phase conductor φ12 and serves to supply an energizing current to the tripping mechanisms for the three three-phase breakers 218, 219 and 220. Again, because of the excessive current demand, a heavy-duty load relay LR2 is interposed between the protective relay PR and the circuit-breaker tripping mechanisms 218, 219, 220, as illustrated in FIG. 10 of the drawings. This again interposes an undesirable time delay from the time of original sensing of the abnormal condition to the final contact-opening operation.

It is an important feature of the present invention to avoid the interposition of a separate heavy-duty load relay, such as the load relay LR1 of FIG. 9, or the load relay LR2 of FIG. 10, and to use in place thereof a solid-state control rectifier, such as a silicon-controlled rectifier SCR, as shown in FIG. 13 in the drawings.

By way of background, attention is directed to FIGS. 11 and 12 of the drawings. It will be noted that the silicon-controlled rectifier is much like an ordinary rectifier which has been modified to block in the forward direction until a small signal is applied to the gate lead. After the gate signal is applied, the silicon-controlled rectifier conducts in the forward direction with a forward characteristic very similar to that of an ordinary rectifier, and will continue conduction even after the gate signal is removed. It may have characteristics similar to those of a gas thyratron, except that the forward drop is about 1/10 that of a thyratron, and the deionization time is less by several orders of magnitude.

FIG. 11 shows the internal construction of an ordinary rectifier, and FIG. 12 illustrates the internal construction of a silicon-controlled rectifier. In an ordinary rectifier, the anode is formed in a wafer of uniform resistivity silicon which is firmly mounted to the stud. In a silicon-controlled rectifier (hereafter referred to as an SCR), the wafer consists of N-type silicon with two P layers diffused into the surfaces. The cathode connection forms a PN junction and the gate lead is attached to the diffused P layer. In summary, an ordinary rectifier consists of an PN junction, whereas a SCR is a PNPN device with an extra connection brought out from the inner P layer.

The present invention is particularly concerned with a tripping scheme in which a solid-state controlled rectifier, such as TRINISTOR-controlled rectifier SCR, can be used as the interposing relay, thus reducing the time delay to an insignificant value (in the order of a few microseconds), and at the same time reduce the current through the contacts of the protective relay PR to a very small value. FIG. 13 diagrammatically illustrates the connections taken with an operating mechanism very similar to that set forth in FIGS. 1–6 of the drawings.

It will be noted that the three three-phase conductors φ13, φ14 and φ16 are controlled by the circuit breaker 11 utilizing three sets of movable contacts 11a, 11b and 11c. These contacts are biased to the open-circuit position by the accelerating spring 13, as previously described. The operating rod 31, as shown, is connected to a bridging contact 221, which bridges a pair of stationary contacts 222 when the circuit breaker is in the closed-circuit position. These contacts are, of course, open in the fully open-circuit position of the breaker parts.

With further reference to FIG. 13 of the drawings, it will be observed that the pneumatically-actuated piston 23 straightens the toggle links 33b, 35b to an over-center condition, thereby latching the circuit breaker in the closed-circuit position. To effect release of the latching means, a push-bar 99, which is fixedly secured to an armature 97 is actuated by the energization of electromagnet means 91, including a coil 95. As shown, the coil 95 is supplied from current by way of the silicon-controlled rectifier SCR. More particularly, the tripping circuit for the coil 95 includes positive terminal 223, a connection 224, the contacts 225 of a "TRIP" button, or the contacts 226 of the protective relay PR, the coil 227 of which is responsive to the energization of the secondary coil 228 of a current transformer CT.

A further connection 229 carries the positive current through a diode D102 through a resistor R101, a second resistor R102 to the gate lead 230 of the controlled rectifier SCR. The cathode 231 is connected to a common connection 232, which leads to the tripping coil 95. To prevent the application of any negative voltage appearing across the controlled rectifier SCR, the diode D101 is employed having a very low resistance in its forward direction.

The function of the capacitors C101, C102, C103 and resistor R105 is to reduce the magnitude of transient voltages that might otherwise appear across the controlled rectifier SCR.

The current to the gate 230 is limited by resistors R102, R101 and the resistance of tripping coil 95, which may be 12 ohms. The gate current has a value sufficient to trigger the SCR into the conducting state for all conditions of ambient temperatures and control voltage values down to minimum trip. The gate current flows through coil 95 and assists in the rapid build up of magnetic flux to trip the circuit breaker, as does the current through resistor R103. A silicon controlled rectifier type may be chosen which has a relatively large gating current. The protective relay PR is required to carry only the gate current and the current through resistor R103. However, if this current is not sufficient to operate the relay target, the resistor R104 can be inserted, as shown, into the circuit by connecting the terminal 233 to the negative side of the line 234. This will cause the relay contact current to increase to about 1.25 amperes, for example, which should be ample to operate the target.

To prevent the circuit breaker mechanism from "pumping," as well understood by those skilled in the art, relays 52X and 52Y are provided with associated contacts, as shown. Also a latch-check switch LCH is provided in the circuit 235, as shown.

FIG. 13 illustrates the position of the several parts in the de-energized condition. To effect closing of the circuit breaker from the open-circuit position thereof the "CLOSE" button 237 is pressed. This connects the positive side of the line 223 through the latch-check switch LCH through the connection 238, through normally-closed contacts 239 of relay 52Y, and through the coil 240 of relay 52X to the connection 241 and hence to the negative side of the line 234.

The energization of coil 240 of relay 52X will close the contacts 242 thereof to provide a bypass circuit around the "CLOSE" button 237. The circuit will now include connection 243, contacts 242 (now closed), connection 244, contacts 239 of relay 52Y, coil 240 of relay 52X, to the connection 241 and to the negative side of the line 234.

The closing of relay 52X will energize the inlet-valve coil 183 by means of the following circuit: connection 245, normally-closed contacts 246 of relay 52Y, bb contacts associated with the breaker mechanism, and which are closed when the circuit breaker is in the open position, connection 247, coil 183, connection 248, contacts 249 of relay 52X, whcih are closed when the relay is energized, to positive terminal 223.

The energization of coil 183 of inlet valve 126 will cause straightening of the toggle 33b, 35b to an over-center latched condition, not shown.

Closing of the circuit breaker 11 closes the coil 251 of relay 52Y by a circuit which includes connection 243, contacts 242 (now closed), coil 251, connection 252, aa contacts of the circuit-breaker mechanism (which close when the mechanism closes), and connection 241 to the negative side of the line 234. The closing of the relay 52Y drops out the coil 240 of the relay 52X by opening the contacts 239 of relay 52Y. Opening of the relay 52X subsequently de-energizes coil 251 of relay 52Y by the opening of contacts 242 of relay 52X. When this occurs, the relays are de-energized and the circuit breaker 11 is latched in the closed position (see FIG. 2).

To effect tripping of the circuit breaker 11, either the trip button 225 is closed, or the protective relay PR picks up the contacts 226 and provides a positive signal to the gate 230 of the silicon-controlled rectifier SCR. This causes a conductive state of the silicon-controlled rectifier from the positive line 254, through connection 255, connection 232, tripping coil 95 and through the contacts 222, which are closed in the breaker-closed position. The tripping circuit is completed through a connection 256 to the negative side of the line 234. The consequent energization of the tripping coil 95 forces the armature 97, and hence the push-bar 99, in a left-ward tripping direction, as viewed in FIG. 13, thereby moving the knee pin 41 of the toggle linkage 257 to a left-ward underset condition to effect opening of the breaker 11 by application of the accelerating spring force 13.

Because of the reduced current, which is drawn by the silicon-controlled rectifier SCR, the duty imposed upon the protective relay PR is a minimum, and the tripping schemes of FIGS. 7 and 8 of the drawings (without interposition of heavy-duty load relays LR1, LR2) may be employed, providing the tripping mechanisms employ the solid-state rectifiers, as described above in connection with their tripping circuits.

From the foregoing description it will be apparent that with the circuit breaker in the closed position, the silicon-controlled rectifier SCR acts as an open switch, and thus, no current flows through the tripping coil 95. When the breaker is to be tripped, either the control switch 225 or the protective relay PR are closed, and a positive voltage, in relation to the cathode 231, is applied to the gate 230. The magnitude of this voltage is, of course, controlled by the resistors R102, R103. Almost instantly, the TRINISTOR-controlled-rectified SCR becomes conducting, thus permitting current to flow through the tripping coil 95. The breaker opens, and the auxiliary contacts 221 open and thus interrupt the flow of current through the tripping coil 95.

With the foregoing arrangement it is possible to trip any number of breakers in parallel without over-loading the contacts of the protective relay PR since the current which flows through the protective relay contacts 226 is only that current which is required to "gate" the silicon-controlled rectifier SCR. The magnitude of this current may be only a fraction of an ampere per breaker. Since the silicon-controlled rectifier SCR begins conduction within a few microseconds from the time that the gate signal is applied, for all practical purposes the often intolerable time delay of an interposing electro-mechanical relay is eliminated.

Certain values of resistance, capacitance and other components which have been successfully utilized in the foregoing tripping circuit arrangement are as follows:

R101—3 watt 50 ohmite #4380
R102—10 watt 1000 ohmite #4823
R103—3 watt 100 ohmite #4392
R104—20 watt 100 ohmite browndevil
R105—3 watt 1 ohmite #4330
SCR—Controlled rectifier GE #C35D
C101—2 mf.—600 v. Aerovox JP30M
C102—1 mf.—600 v. Aerovox P89ZXY—600–1
C103—.01 mf. 1 kv. CRL DD–103
D101—Diode West. #341K
D102—Diode West. #320K This is for a tripping control voltage of 125 volts D.C. between terminals 223 and 234.

Although there has been illustrated and described specific arrangements, it to be clearly understood that the same were merely for the purpose of illustration, and that changes and modifications may readily be made therein by those skilled in the art without departing from the spirit and scope of the invention.

I claim as my invention:

1. A tripping circuit for use with a circuit breaker operating mechanism having a tripping coil, comprising in combnation, a source of direct current potential having first and second terminals, a controlled rectifier having an anode, cathode and a control element, circuit means connecting the tripping coil and the anode-cathode path of the controlled rectifier in series across said first and second terminals with the anode connected to said second terminal whereby when the controlled rectifier is gated on by the flow of a gating current in the control element the anode-cathode current flows through the tripping coil, a relay having a winding and a pair of normally open contacts, the relay being adapted to close the contacts thereof upon a predetermined signal in the winding, one contact of said pair of contacts being connected to the second terminal of the source of direct current potential, circuit means operatively connecting the other contact of said pair of contacts to the control element of the controlled rectifier, the closing of the contacts of the relay completing a circuit between the first and second terminals of the source of direct current potential by way of the tripping coil and the cathode-control element path through the controlled rectifier whereby the gating current of the controlled rectifier in addition to the anode-cathode current of the controlled rectifier flows through the tripping coil of the circuit breaker thereby shortening the time required for flux to build up in said tripping coil to a value sufficient to trip the circuit breaker.

2. A tripping circuit for use with a circuit breaker operating mechanism including a tripping coil, comprising in combination, a direct-current source of potential, a controlled rectifier having an anode, cathode and a control element, circuit means connecting the tripping coil and the anode-cathode path of the controlled rectifier in series across the direct current source, other normally open circuit means connecting said tripping coil and the cathode-control element path through the controlled rectifier in series across the direct current source, the other circuit means when closed causing current to flow through the control element-cathode path of the controlled rectifier to gate the rectifier on, the resistance of the tripping coil of the circuit breaker limiting the control element current of the controlled rectifier while utilizing the control element current of the controlled rectifier to assist the anode-cathode current in rapidly building up the flux in the tripping coil to a value sufficient to trip the circuit breaker.

3. A tripping circuit for use with a circuit breaker having a tripping coil, said coil having a predetermined resistance value, comprising in combination, a source of direct current potential, a controlled rectifier having an anode, cathode and a control element, circuit means connecting the tripping coil in series with the anode-cathode path of the controlled rectifier across the direct current source, other normally open circuit means connecting the tripping coil in series with the cathode-control element path through the controlled rectifier across the direct current source, relay means for closing the last-named circuit means, the closing of the last-named circuit means causing control current to flow through the control element and gate the controlled rectifier on, said control element current also flowing through the tripping coil and assisting in the rapid build up of flux in the tripping coil to a value which causes the tripping of the circuit breaker, the resistance of said tripping coil assisting in limiting the control element current to a predetermined value.

4. In combination, a circuit breaker biased to the open-circuit position, an operating mechanism operable to effect closing of the circuit breaker, latching means for releasably holding said breaker in the closed position, and tripping means, the tripping means including a tripping coil, a source of direct current potential having first and second terminals, a controlled rectifier having an anode, cathode and a control element, circuit means connecting the tripping coil and the anode-cathode path of the controlled rectifier in series across said first and second terminals with the anode connected to said second terminal whereby when the controlled rectifier is gated on by the flow of a gating current in the control element the anode-cathode current flows through the tripping coil, a relay having a winding and a pair of normally open contacts, the relay being adapted to close the contacts thereof upon a predetermined signal in the winding, one contact of said pair of contacts being connected to the second terminal of the source of direct current potential, circuit means operatively connecting the other contact of said pair of contacts to the control element of the controlled rectifier, the closing of the contacts of the relay completing a circuit between the first and second terminals of the source of direct current potential by way of the tripping coil and the cathode-control element path through the controlled rectifier whereby the gating current of the controlled rectifier in addition to the anode-cathode current of the controlled rectifier flows through the tripping coil of the circuit breaker thereby shortening the time required for flux to build up in said tripping coil to a value sufficient to trip the circuit breaker.

5. In combination, a circuit breaker including a tripping coil, a direct current source of potential, a controlled rectifier having an anode, cathode and a control element, circuit means connecting the tripping coil and the anode-cathode path of the controlled rectifier in series across the direct current source, other normally open circuit means connecting said tripping coil and the cathode-control element path through the controlled rectifier in series across the direct current source, the other circuit means when closed causing current to flow through the control element-cathode path of the controlled rectifier to gate the rectifier on, the resistance of the tripping coil of the circuit breaker limiting the control element current of the controlled rectifier while utilizing the control element current of the controlled rectifier to assist the anode-cathode current in rapidly building up the flux in the tripping coil to a value sufficient to trip the circuit breaker.

6. In combination, a circuit breaker having a tripping coil, said coil having a predetermined resistance value, a source of direct current potential, a controlled rectifier having an anode, cathode and a control element, circuit means connecting the tripping coil in series with the anode-cathode path of the controlled rectifier across the direct current source, other normally open circuit means connecting the tripping coil in series with the cathode-control element path through the controlled rectifier across the direct current source, relay means for closing the last-named circuit means, the closing of the last-named circuit means causing control current to flow through the control element and gate the controlled rectifier on, said control element current also flowing through the tripping coil and assisting in the rapid buildup of flux in the tripping coil to a value which causes the tripping of the circuit breaker, the resistance of said tripping coil assisting in limiting the control element current to a predetermined value.

References Cited
UNITED STATES PATENTS

| | | | |
|---|---|---|---|
| 3,183,416 | 5/1965 | Circle | 317—148.5 |
| 3,239,718 | 3/1966 | Fegley | 317—33 X |
| 3,264,634 | 11/1966 | Voight. | |

MILTON O. HIRSHFIELD, *Primary Examiner.*

R. V. LUPO, *Assistant Examiner.*